May 22, 1945.  S. DILLER  2,376,587
FRUIT BRUSHING MACHINE
Filed Dec. 2, 1942  2 Sheets-Sheet 1
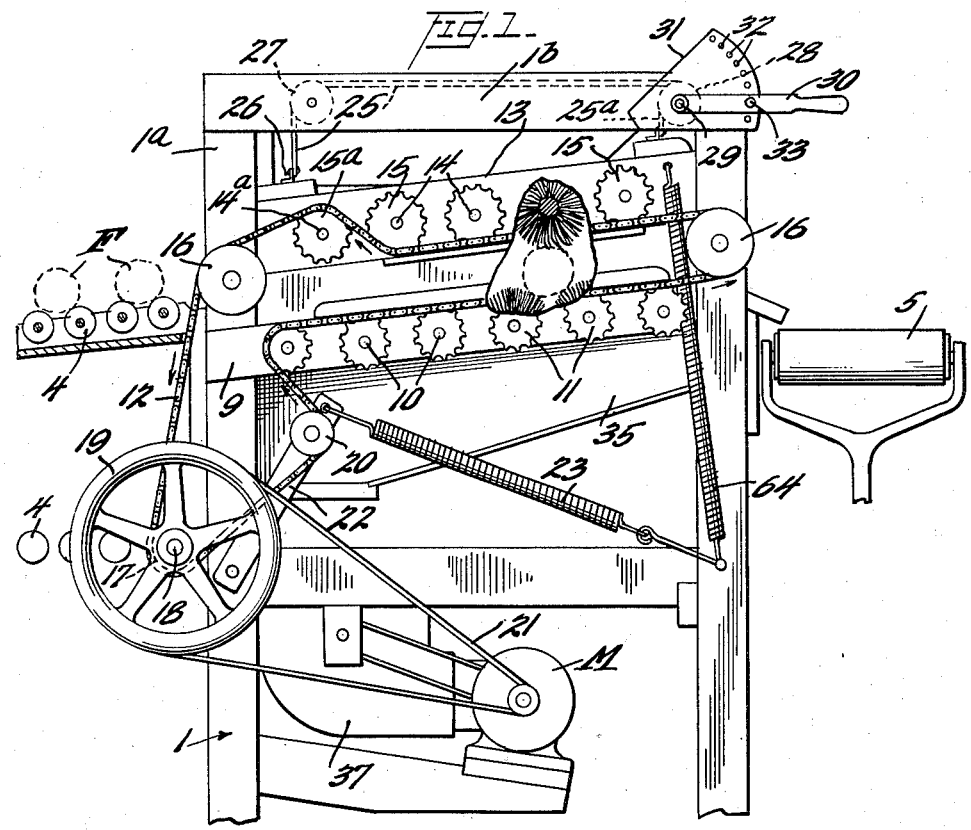
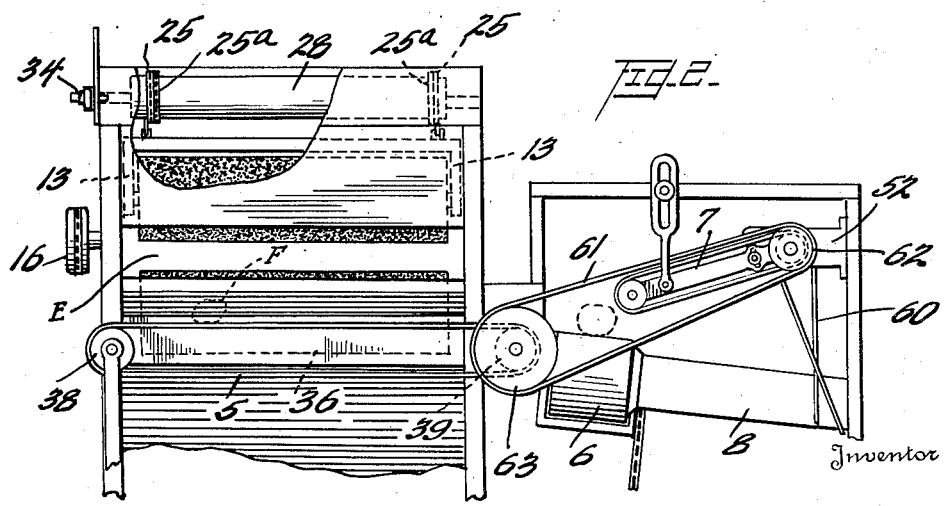

May 22, 1945.  S. DILLER  2,376,587
FRUIT BRUSHING MACHINE
Filed Dec. 2, 1942  2 Sheets-Sheet 2
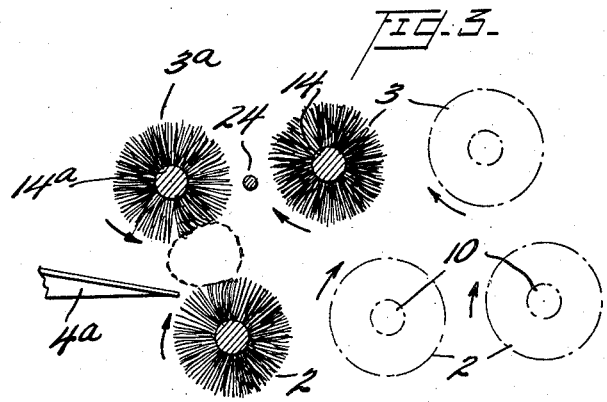
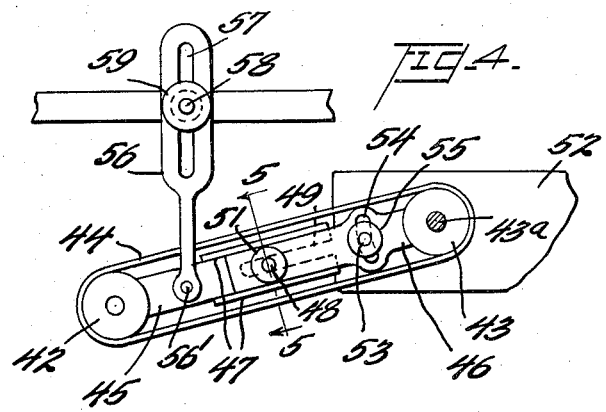
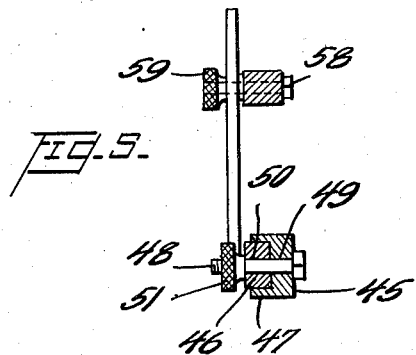
Inventor
Sanford Diller,
By Eugene D. Purdy
Attorney Patented May 22, 1945

2,376,587

UNITED STATES PATENT OFFICE 2,376,587

FRUIT BRUSHING MACHINE

Sanford Diller, Benton Harbor, Mich.

Application December 2, 1942, Serial No. 467,638

2 Claims. (Cl. 146—202)

This invention relates to brushing machines, and more particularly to machines for cleaning dirt and spray residues from fruit, such as apples and oranges, and for removing the fur from peaches, to improve its appearance and increase its saleability.

An important object of the invention is to provide a brushing machine of the above character in which the brushes are so driven as to more effectively clean or polish the fruit.

Another object of the invention is to provide a brushing machine of the above character comprising a pair of spaced-apart rows of rotary brushes between which the fruit to be cleaned passes, and improved means for adjusting the space between the rows of brushes to correspond to different sizes of fruit.

Other objects and advantages will be apparent from the following detailed description of a preferred embodiment of the invention, reference being had to the annexed drawings, in which:

Figure 1 is a side view of a fruit brushing and grading machine;

Figure 2 is a view showing the right-hand end of the machine illustrated in Fig. 1, parts being broken away to better show the brush adjusting mechanism;

Figure 3 is a detail view showing the arrangement and direction of rotation of the brushes first encountered by the fruit upon entering the machine.

Figure 4 is a detail showing one of the selector arms for removing fruit from the grading conveyor belt; and Figure 5 is a cross-sectional view through the selector arm taken on the line 5—5 of Fig. 4.

The fruit brushing and grading machine illustrated in the drawings comprises a frame 1, supporting in slightly inclined parallel planes a lower row of rotary brushes 2 and an upper row of rotary brushes 3. A roller belt 4, driven in the direction indicated by the arrow in Fig. 1 by means not shown, delivers the fruit F to be cleaned—for example peaches—into the space between the parallel rows of brushes at one end of the machine while at the opposite end of the machine the fruit emerges from between the brushes onto a transfer conveyor belt 5, more clearly shown in Fig. 2. From the transfer conveyor belt the fruit is fed onto a grading conveyor belt 6 which extends parallel to a side of the frame 1, selector arms 7 being provided along the grading belt for selectively removing the fruit therefrom according to size and dropping it into bins 8.

The frame is of box-shaped skeleton construction comprising upright and horizontal members 1a and 1b, respectively. Upon opposite sides of the frame, secured to and extending lengthwise between the uprights 1a, are side rails 9. Shafts 10, each carrying a rotary brush 2, extend crosswise of the frame and have their ends rotatably supported in the side rails 9, the shafts being arranged in upwardly stepped relation so as to impart a slight upward inclination to the course of the brushes from the forward to the rear ends of the machine. These shafts at one end project beyond the outer face of a side rail and have secured thereon sprockets 11. An inclined apron 4a is fastened to the frame in advance of the lower row of brushes to direct the fruit delivered by the roller belt into the space between the upper and lower rows of brushes.

Inside the frame is suspended a pair of side rails 13, companion to and located above the side rails 9, and these side rails rotatably support the ends of a series of shafts 14 carrying the upper row of brushes 3 arranged in laterally offset relation to the lower brushes 2. The shafts 14 at one end project outwardly beyond a side rail 13 and the projecting ends are provided with sprockets 15 lying in the same vertical plane with the sprockets 11. An endless chain 12 winds over a pulley 16 rotatably mounted on the frame adjacent the rear end of the machine, the arrangement being such that the chain extends in two opposed parallel runs, one run being tangent to the sprockets 11 driving the lower row of brushes and the other run being tangent to the sprockets 15 driving the upper row of brushes. The upper run extends over an idler pulley 16, located at the forward end of the frame, and thence downwardly around a gear 17 mounted on shaft 18 carrying a large driving pulley 19. The other run of the chain extends downwardly over a tensioning roller 20 and thence around the gear 17 to unite with the other run of the chain.

The pulley 19 is driven by an electric motor M through a transmission belt 21 operatively connecting the motor with this pulley. For maintaining the chain taut and yet allowing it to be played in or out as adjustments between the brushes may require, as will later be explained, the roller 20 is mounted on a swinging arm 22 upon which a pull is exerted by a coil spring 23 anchored at one end to the machine frame 1.

The gear 17 is driven by the motor M so as to cause the chain to travel in the directions indicated by the arrows in Fig. 1, imparting clockwise rotation to the sprockets 11 and 15 and to the lower and upper rows of brushes 2 and 3, with the exception of the forward sprocket 15a on the shaft 14a carrying the leading brush 3a of the upper row of brushes. The sprockets 15 and 15a and their brushes are of somewhat larger diameter than the sprockets 11 and their brushes so that the upper row of brushes rotate at a slower speed than the lower row of brushes. The chain 12 is trained upwardly from the bottom of the forward sprocket 15, over the top of sprocket 15a, and thence downwardly around the idler 16, and this causes the brush 3a associated with sprocket 15a to turn counterclockwise and in a reverse direction with respect to the other brushes. A bar 24 extends crosswise between the side rails 13 at an elevation slightly below a plane including the axes of the shaft 14a and an adjacent shaft 14, this bar serving to prevent the fruit from being lifted out of the machine by the oppositely rotating brushes 3 and 3a.

The side rails 13 are suspended for vertical adjustment from two pairs of chain sections 25 and 25a connected at their lower ends to angle irons 26 extending crosswise between the rails at opposite ends thereof. The pair of chain sections 25 supporting the forward end of the rails 13 extend upwardly over a roller 27, mounted between two side framing members 1b at the top of the machine, and thence horizontally forward where they wind around a roller 28 to which the ends of the chain sections are fastened. The roller 28 is mounted upon a shaft 29 extending between and rotatably mounted in the side members 1b at the top of the machine frame 1. The chain sections 25a supporting the rear end of the rails 13 extend upwardly and over the roller 28, to which the ends of the chain sections are fastened. For turning the roller 28 to take up and play out the chain sections 25 and 25a, and consequently to raise and lower the rails 13 carrying the upper row of brushes, a lever 30 is keyed to an end of shaft 29 projecting laterally beyond the side member 1a. Secured to the machine frame behind the lever 30 is a sector plate 31 provided with apertures 32 arranged at equidistantly spaced-apart intervals in the form of an arc concentric with the shaft 29. The lever 30 is provided with an aperture 33 adapted to be moved into registry with any one of the apertures 32 in the sector plate and to receive a pin 34 for locking the lever in position when the proper adjustment between the brushes has been obtained. The apertures 32 on the sector plate may serve as an indicator or the sector plate may be provided with a scale to afford a reading of the spacing between brushes.

Tension springs 64 extending between the side rails 13 and a fixed part of the frame on opposite sides of the machine yieldingly maintain the upper row of brushes in position.

Below the lower row of brushes 2 the frame is walled-in as indicated at 35 to form a closed chamber 36. To the sloping bottom of this chamber is connected a suction fan 37 for creating a downward draft through the brushes 2, 3 and 3a to carry off the dirt, linters and other foreign matter removed from the fruit by the brushes. The fan may exhaust to the atmosphere or to a waste receptacle, as desired.

The transfer conveyor belt 5 travels horizontally over rollers 38 and 39 rotatably supported at the end of the machine in a position such as to receive the fruit discharged from between the rows of brushes and out through the exit E at the end of the machine and carry it laterally in the direction of the arrow in Fig. 2 onto the grading conveyor belt 6. The grading belt is supported so as to travel in a horizontal plane but is inclined transversely, as best shown in Fig. 2, so that the fruit, which is of generally spherical shape, such as peaches, apples, oranges, etc., tends to roll off of one side of the belt but being restrained from so doing by the selector arms 7 located side-by-side along the lower side of the belt.

Each selector arm, as more clearly shown in Figs. 4 and 5, comprises a pair of rollers 42 and 43 between which travels a flat selector belt 44. The roller 42 is rotatably mounted on the outer end of the arm while the other roller 43 is keyed to a shaft 43a extending freely through the inner end of the arm. The arm is composed of two sections, an outer section 45 and an inner section 46. For adjusting the length of the arm to maintain the belt 44 taut, the arm sections lie in flat side-by-side contact and arm section 45 is provided with a pair of spaced-apart flanges 47 forming a longitudinally-extending guideway for slidably embracing the arm section 46. The arm sections are fastened in longitudinally adjusted position by means of a headed stud 48 projecting through a longitudinal slot 49 in the arm section 45 and through a circular hole 50 in arm section 46. A clamping nut 51 is associated with the projecting screw-threaded end of the stud and is adapted to be screwed up into engagement with the arm section 46, thus firmly clamping the arm sections between the head of the stud and the nut.

The arm section 46 is pivotally mounted on the shaft 43a rotatably supported in brackets 52 secured to and projecting from the machine frame 1, as best indicated in Fig. 2. The pivotal axis of this arm section is coincident with the axis of shaft 43a which extends through the brackets and is common to all the selector arms stationed along the grading belt. Each bracket carries a headed stud 53, which projects through an arcuate-shaped slot 54 in the arm section 46 and this stud is provided upon its projecting threaded end with a clamping nut 55. The stud 53 and nut 55 operate similarly to the stud 48 and nut 51, already described, to retain the arm section 46 at different angular positions of adjustment about the axis of shaft 43a. For supporting the outer end of the selector arm, there is provided a hanger 56 having its lower end pivotally connected at 56' to the arm section 45 and its upper end provided with a longitudinal slot 57 adapted to pass the threaded end of a stud 58 fixed to and projecting from the machine frame. A clamping nut 59 screwed onto the threaded end of the stud bears against a flat face of the hanger to secure the hanger in its position of vertical adjustment.

It will be apparent from the above that by releasing the clamping nuts 53 and 59 the selector arm may be swung upwardly or downwardly to change the spacing between the selector belt 44 and the grading belt 6, and upon tightening these nuts the arm is held in its adjusted position. The transfer belt 5, the grading belt 6 and the selector belts 44 may be driven in any suitable manner. In the present embodiment of the invention, the motor (not shown) which serves to operate the exhaust fan 37 is coupled to shaft 43a by a transmission belt 60. Since the rollers 43 of all the selector arms are keyed to shaft 43a, the transmission belt 60 simultaneously drives all the selector belts 44. Another transmission belt 61 winding between a pulley 62 on the shaft 43a and a larger pulley 63 on the same shaft with the roller 39, serves to drive the transfer conveyor belt 6, the latter belt traveling at a slower rate than the selector belts.

In practice, the series of selector arms mounted side-by-side along the grading belt are independently adjustable to select progressively larger sizes of fruit as the fruit is carried along on the grading belt. That is, when a peach, for example, comes opposite a selector arm in which the space between the arm and the grading belt is sufficient to allow the peach to pass, the latter is flipped by the rapidly traveling selector belt into the bin 8 associated with that particular arm and in this way the fruit is automatically sorted as to size.

In the operation of the fruit brushing and grading machine described above, the fruit is carried by the roller belt 4 to a position at the forward end of the machine just in advance of the brushes. The fruit discharged from the roller belt drops down onto the inclined apron 6a from which it rolls into the space between the upper and lower rows of brushes.

Because the two leading brushes 2 and 3a of the lower and upper rows of brushes rotate toward each other, the fruit is drawn into the space between the two rows of brushes. The cross-bar 24 prevents the peach from being lifted out of the machine by the two oppositely rotating brushes 3a and 3 of the upper row of brushes. The peach is impelled along by the lower row of brushes 2 through the upwardly inclined course between the rows of brushes and it is turned over and over by the brushes 3 of the upper row which rotate in a direction opposing the forward travel of the fruit. This subjects the peach to a thorough brushing operation, removing its fur and all dirt and other foreign matter adhering to its surface.

The peach is finally expelled from between the rows of brushes onto the transfer conveyor belt 5 which moves it onto the transversely sloping grading conveyor belt 6. The selector arms 7 having been individually adjusted as to height in a manner which has already been described prevents the peach from rolling off the belt until it reaches a selector arm which is adjusted a sufficient distance above the grading belt to afford clearance for the passage of the peach. The traveling surface of the selector belt 44 then rolls the peach off the grading belt into a bin 8.

The machine is adapted to accommodate different kinds of fruit. For example, if the machine is to be used with oranges or grape fruit the only adjustments necessary are to increase the space between the rows of brushes by operating the lever 30 and to raise the selector arms 7 by resetting the clamping nuts 55 and 58. This adapts the machine to the larger normal size of this fruit.

It will be apparent that by mounting the leading brush 3a of the upper row of brushes so that it turns counterclockwise, this brush will act cooperatively with the leading brush of the lower row of brushes 2 to facilitate the introduction of the fruit between the rows of brushes, and that in the passage of the fruit up a slight incline between the pairs of brushes the fruit is brushed in opposite directions with a sort of scrubbing action. Because of the convenient means for adjusting the upper row of brushes toward and from the lower row, the desired spacing between the brushes for any of the kinds of fruit to be cleaned may be readily obtained so as not to injure the fruit, and especially fruit such as peaches which has a tender skin. In the case of peaches, the effect of the brushes will be to remove the fur and impart a slight polish to the skin so as to render this fruit more attractive in appearance.

In angularly adjusting a selector arm 7 about its pivotal connection with the shaft 43a, the outer end of the arm shifts its position in a direction transversely of the belt. The means described above for extending and retracting the selector arms 7 is desirable in order to compensate for this shifting and insure that the end of the arm slightly overhangs the side margin of the belt.

It is to be understood that the fruit brushing and grading machine described above is exemplary of a preferred embodiment of my invention and that obviously various changes in the form, construction, arrangement and combination of the several parts may be made and substituted for those herein shown and described without departing from the nature and principle of my invention as defined in the following claims.

I claim:

1. In a fruit brushing machine, the combination with upper and lower rows of rotary brushes arranged in spaced-apart generally parallel relation so as to provide an upwardly inclined course of travel for the fruit between the rows of brushes, and the brushes of one row being laterally offset with respect to the brushes of the other row, of sprockets associated with the ends of said brushes and disposed in a common plane, a transmission chain having runs thereof extending in opposed approximately parallel relation and tangent to and drivingly engaging said sprockets for rotating said brushes in the same direction, and the upper run of said chain having a portion thereof engaging the sprocket of the leading brush of the upper row of brushes so as to rotate said brush in a reverse direction to the other brushes.

2. A fruit brushing machine comprising upper and lower rows of rotary brushes arranged in spaced-apart generally parallel relation so as to provide an upwardly inclined course of travel for the fruit between the rows of brushes, the brushes of one row being laterally offset with respect to the brushes of the other row, sprockets associated with said brushes, the sprockets of the upper row of brushes being larger in diameter than the sprockets of the lower row, and a driving chain engaging said sprockets whereby to drive the upper and lower rows of brushes at different speeds, said chain being so constructed and arranged as to rotate the leading brush of the upper row of brushes in a counter-clockwise direction and the remainder of the brushes in a clockwise direction.

SANFORD DILLER.